(12) United States Patent
    Paczkowski et al.

(10) Patent No.: US 10,623,415 B2
(45) Date of Patent: Apr. 14, 2020

(54) VIRTUAL NETWORK FUNCTION (VNF) HARDWARE TRUST IN A NETWORK FUNCTION VIRTUALIZATION (NFV) SOFTWARE DEFINED NETWORK (SDN)

(71) Applicant: Sprint Communications Company L.P., Overland Park, KS (US)

(72) Inventors: Lyle Walter Paczkowski, Mission Hills, KS (US); James Patrick Sisul, Overland Park, KS (US); Marouane Balmakhtar, Dumfries, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/044,229

(22) Filed: Jul. 24, 2018

(65) Prior Publication Data

US 2018/0332052 A1    Nov. 15, 2018

Related U.S. Application Data

(63) Continuation of application No. 15/216,677, filed on Jul. 21, 2016, now Pat. No. 10,069,844.

(51) Int. Cl.
*H04L 29/06* (2006.01)
*G06F 9/455* (2018.01)
*H04L 29/08* (2006.01)
*H04L 12/701* (2013.01)

(52) U.S. Cl.
CPC ........ *H04L 63/123* (2013.01); *G06F 9/45558* (2013.01); *H04L 45/00* (2013.01); *H04L 67/16* (2013.01); *G06F 2009/45587* (2013.01); *G06F 2009/45595* (2013.01)

(58) Field of Classification Search
CPC .................................................... H04L 63/123
See application file for complete search history.

(56) References Cited

U.S. PATENT DOCUMENTS

| | | |
|---|---|---|
| 8,600,792 B2 | 12/2013 | Drittler et al. |
| 9,210,061 B2 | 12/2015 | Richards et al. |
| 9,311,160 B2 | 4/2016 | Parker |
| 2014/0201374 A1 | 7/2014 | Ashwood-Smith et al. |

(Continued)

FOREIGN PATENT DOCUMENTS

| | | |
|---|---|---|
| WO | 2015058626 | 4/2015 |
| WO | 2015061353 | 4/2015 |

(Continued)

OTHER PUBLICATIONS

Ludovic Jacquin, et al.; "The trust problem in modern network infrastructures;" Cyber Security and Privacy; Nov. 2015; pp. 116-127; Springer.

*Primary Examiner* — Simon P Kanaan (57) ABSTRACT

A Network Function Virtualization Infrastructure (NFVI) maintains hardware-trusted communications. In the NFVI, a hardware-trust controller executes at a Ring 0 security level. A target Virtual Switch (vSW) executes under control of the hardware-trust controller. The hardware-trust controller transfers hardware-trust data to the target vSW that indicates hardware-trusted vSWs. The target vSW receives a Virtual Data Unit (VDU) from a source vSW. The target vSW transfers the VDU when the source vSW is one of the hardware-trusted vSWs. The target vSW blocks the VDU when the source vSW is not one of the hardware-trusted vSWs.

20 Claims, 7 Drawing Sheets

(56) References Cited

U.S. PATENT DOCUMENTS

| | | |
|---|---|---|
| 2014/0317261 A1 | 10/2014 | Shatzkamer et al. |
| 2015/0063166 A1 | 3/2015 | Sif et al. |
| 2015/0124622 A1 | 5/2015 | Kovvali et al. |
| 2015/0149613 A1 | 5/2015 | Kakadia et al. |
| 2015/0180730 A1 | 6/2015 | Felstaine et al. |
| 2015/0263979 A1 | 9/2015 | Kasturi |
| 2016/0127333 A1 | 5/2016 | Sood et al. |

FOREIGN PATENT DOCUMENTS

| | | |
|---|---|---|
| WO | 2015101153 | 7/2015 |
| WO | 2015135611 | 9/2015 |
| WO | 2015143610 | 10/2015 |
| WO | 2015158108 | 10/2015 |
| WO | 2015169126 | 11/2015 |
| WO | 2015183940 | 12/2015 |
| WO | 2016026129 | 2/2016 |
| WO | 2016037479 | 3/2016 |

VIRTUAL NETWORK FUNCTION (VNF) HARDWARE TRUST IN A NETWORK FUNCTION VIRTUALIZATION (NFV) SOFTWARE DEFINED NETWORK (SDN)

RELATED CASES

This United States patent application is a continuation of U.S. patent application Ser. No. 15/216,677 that was filed on Jul. 21, 2016 and is entitled, "VIRTUAL NETWORK FUNCTION (VNF) HARDWARE TRUST IN A NETWORK FUNCTION VIRTUALIZATION (NFV) SOFTWARE DEFINED NETWORK (SDN)." U.S. patent application Ser. No. 15/216,677 is hereby incorporated by reference into this United States patent application.

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a virtual layer (hypervisors, virtual containers, NFV controllers) that control VNF access to NFV hardware (circuitry, memory, communication interfaces). The virtual layer also controls the NFV thread (processing time cycle) for the VNFs. To implement a data communication service, an NFV Management and Orchestration (MANO) system drives the NFV hardware to execute and support the VNFs based on various network service descriptors for the data communication service.

In NFV SDN systems, the VNFs may be SDN applications, SDN controllers, and SDN virtual data machines. The SDN application VNFs communicate with one another by transferring Virtual Data Units (VDUs) or Virtual Machines (VMs). The VNFs use NFV SDN virtual Switches (vSWs) to transfer the VDUs/VMs between each other. Thus, vSWs provide the basic connectivity between SDN VNFs.

Hardware trust entails the exchange of trust data with a processing system to validate the identity of the hardware used by the processing system. Typically, a hardware trust server stores a secret security key that is also physically embedded into the processing system. The hardware trust server and issues a random number to the processing system. The processing system hashes the random number with its secret, physically-embedded security key to generate a trust result for the hardware trust server. The hardware trust server hashes the random number with its own stored security key to verify the trust result and establish hardware trust with the processing system.

Unfortunately, the ability of NFV VNFs to communicate with one another over SDN vSWs is not adequate. In particular, the integration of hardware trust into the SDN vSWs that operate in NFV systems is inefficient and ineffective.

Technical Overview

A Network Function Virtualization Infrastructure (NFVI) maintains hardware-trusted communications. In the NFVI, a hardware-trust controller executes at a Ring 0 security level. A target Virtual Switch (vSW) executes under control of the hardware-trust controller. The hardware-trust controller transfers hardware-trust data to the target vSW that indicates hardware-trusted vSWs. The target vSW receives a Virtual Data Unit (VDU) from a source vSW. The target vSW transfers the VDU when the source vSW is one of the hardware-trusted vSWs. The target vSW blocks the VDU when the source vSW is not one of the hardware-trusted vSWs.

DETAILED DESCRIPTION

FIGS. 1-5 illustrate Network Function Virtualization (NFV) Software Defined Network (SDN) 100 to maintain hardware trusted communications among Virtual Network Functions (VNFs) 121-122. NFV SDN 100 comprises user data machines 101, SDN data machines 102, NFV Infrastructure (NFVI) 111, and NFV SDN hardware trust server 150. Data machines 101-102, NFVI 111, and trust server 150 each comprise data processing circuitry, data memory, operating software, and data communication transceivers. NFV SDN 100 exchanges user data for user data machines 101 that comprise computers, phones, or some other intelligent machines. The user data exchange supports NFV SDN services such as media streaming, audio/video conferencing, file transfer/messaging, internet access, or some other computerized information service.

Figure 1:
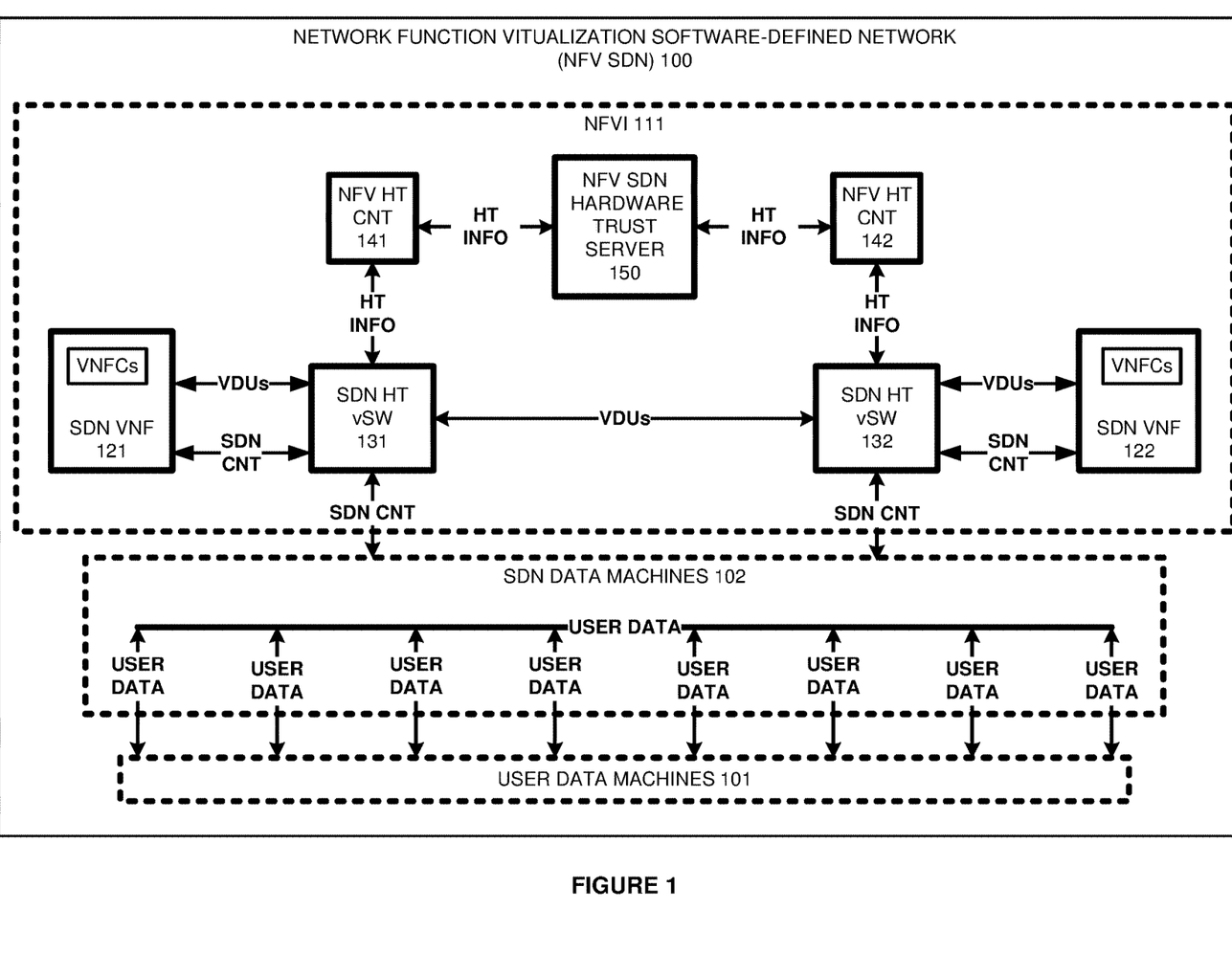
FIGS. 1-5 illustrate a Network Function Virtualization (NFV) Software Defined Network (SDN) to maintain hardware trusted communications among Virtual Network Functions (VNFs).

NFVI 111 comprises SDN VNFs 121-122, SDN Hardware Trust Virtual Switches (HT vSWs) 131-132, NFV Hardware Trust Controllers (HT CNTs) 141-142. SDN VNFs 121-122 comprise VNF Components (VNFCs) that exchange Virtual Data Units (VDUs) with one another. The VNFCs in SDN VNF 121 may exchange VDUs over SDN HT vSWs 131-132 with the VNFCs in SDN VNF 122. SDN VNFs 121-122 may comprise SDN applications and/or SDN controllers. The VDUs may comprise Virtual Machines (VMs). The SDN controllers in VNFs 121-122 exchange SDN control data with SDN data machines 102 over SDN HT vSWs 131-132 (or some other HT vSWs). SDN data machines 102 process the SDN control data to perform networking actions on the user data like packet forwarding, storing, and dropping to support the NFV SDN data services.

In NFVI 111, NFV HT controllers 141-142 execute at a Ring 0 security level. The Ring 0 security level provides priority access over NFVI 111 resources and the ability to control software and data access to NFVI 111. Part of the Ring 0 control entails establishing hardware trust with NFV SDN hardware trust server 150. To establish this hardware trust, NFV SDN hardware trust server 150 stores a security key that is also stored in a Ring 0 security level read-only memory in NFVI 111. NFV SDN hardware trust server 150 transfers a random code to NFV HT controller 141 in NFVI 111, and HT controller 141 hashes the random code with the security key to return a hardware trust result to server 150. NFV SDN hardware trust server 150 hashes the random code with its stored security key to generate a verification hardware trust result. Hardware trust server 150 then compares the hardware trust result from NFV HT controller 141 to its own verification hardware trust result, and if they match, hardware trust between hardware trust server 150 and HT controller 141 is established. NFV HT trust controller 142 operates in a similar manner.

Ring 0 control enables NFV HT controllers 141-142 to initiate and control the execution of SDN HT vSWs 131-132 in NFVI 111. SDN HT vSW 131 serves VNF 121 with VDU and/or SDN control exchanges. SDN HT vSW 132 serves VNF 122 with VDU and/or SDN control exchanges. SDN HT vSWs 131-132 report their served VNFs to their respective NFV HT controllers 141-142. NFV HT controllers 141-142 report the served VNF/vSW combinations to hardware trust server 150.

Hardware trust server 150 receives and aggregates the reports from NFV HT controllers 141-142 to associate hardware trust with select SDN HT vSWs. Hardware trust server 150 transfers hardware trust information (HT INFO) to HT controllers 141-142 that indicates the hardware trusted SDN HT vSWs 131-132—and typically other hardware trusted SDN HT vSWs. Hardware trust controller 141 transfers the HT information to SDN HT vSW 131 that indicates the hardware trusted SDN HT vSW 132 and maybe some other SDN HT vSWs. Hardware trust controller 142 transfers HT information to SDN HT vSW 132 that indicates the hardware trusted SDN HT vSW 131 and maybe some other SDN HT vSWs.

A VNFC in SDN VNF 121 transfers a VDU to SDN HT vSW 131 for delivery to a VNFC in SDN VNF 122 through SDN HT vSW 132. Before making the VDU through another SDN vSW, SDN HT vSW 131 will check its HT information from HT controller 141 to verify that SDN HT vSW 132 is currently hardware trusted. If hardware trust is verified for the target SDN vSW—SDN HT vSW 132—then SDN HT vSW 131 transfers the VDU to SDN HT vSW 132 for delivery to the VNFC in VNF 122. SDN HT vSW 132 transfers the VNFC to the target VNFC in VNF 122. If hardware trust is not verified for target SDN HT vSW 132, then SDN HT vSW 131 blocks the transfer of the VDU to untrusted SDN HT vSW 132.

Note that hardware trust server 150 hosts information to enable hardware trusted communications across physical boundaries. The physical boundaries might be the separation between Central Processing Units (CPUs), CPU cores, NFV servers, NFV threads, and NFVIs. Advantageously, a source SDN HT vSW may transfer VDUs to a target vSW across physical boundaries if the HT information indicates the target vSW is trusted. Thus, the VNFs and VNFCs that are served by trusted SDN HT vSWs may readily exchange hardware trusted communications across physical boundaries. The SDN HT vSWs also preclude the VNFs from improperly transferring their VDUs across untrusted physical boundaries.

In some examples, target SDN HT vSW 132 may also apply hardware trust filtering upon VDU receipt from another vSW. The VDU transferred by the VNFC in SDN VNF 121 over SDN HT vSW 131 arrives at SDN HT vSW 132 for delivery to the VNFC in SDN VNF 122. Before making the VDU transfer, SDN HT vSW 132 checks its hardware trust information from HT controller 142 to verify that SDN HT vSW 131 is hardware trusted. If hardware trust is verified for the source vSW—SDN HT vSW 131—then SDN HT vSW 132 transfers the VDU to the target VNFC in VNF 122. If hardware trust is not verified for source SDN HT vSW 131, then SDN HT vSW 132 blocks the transfer of the VDU to the target VNFC in VNF 122.

In some examples, SDN HT vSWs 131-132 also report additional information for their served VNFs like their VNFCs, NFV threads, NFVIs, NFV servers, NFV descriptors, or some other networking data. NFV HT controllers 141-142 report this information to hardware trust server 150, and trust server 150 associates the vSW hardware trust for the VNF with related data like VNFCs, NFV threads, NFVIs, NFV servers, and NFV descriptors. Hardware trust server 150 augments the HT information to indicate hardware trust for these VNFs, VNFCs, NFV threads, NFVIs, NFV servers, NFV descriptors, and the like. Before making VDU transfers, SDN HT vSWs 131-132 may also check hardware trust information from HT controllers 141-142 to verify that, in addition to vSW trust, that one or more of the target VNFs, VNFCs, NFV threads, NFVIs, NFV servers, and/or NFV descriptors for the VDU are also hardware trusted. If hardware trust is verified for the target vSW and these other designated trust targets (VNFs, VNFCs, NFV threads, NFVIs, NFV servers, NFV descriptors), then SDN HT vSWs 131-132 transfer the VDU to the target SDN HT vSW for subsequent delivery.

Figure 2:
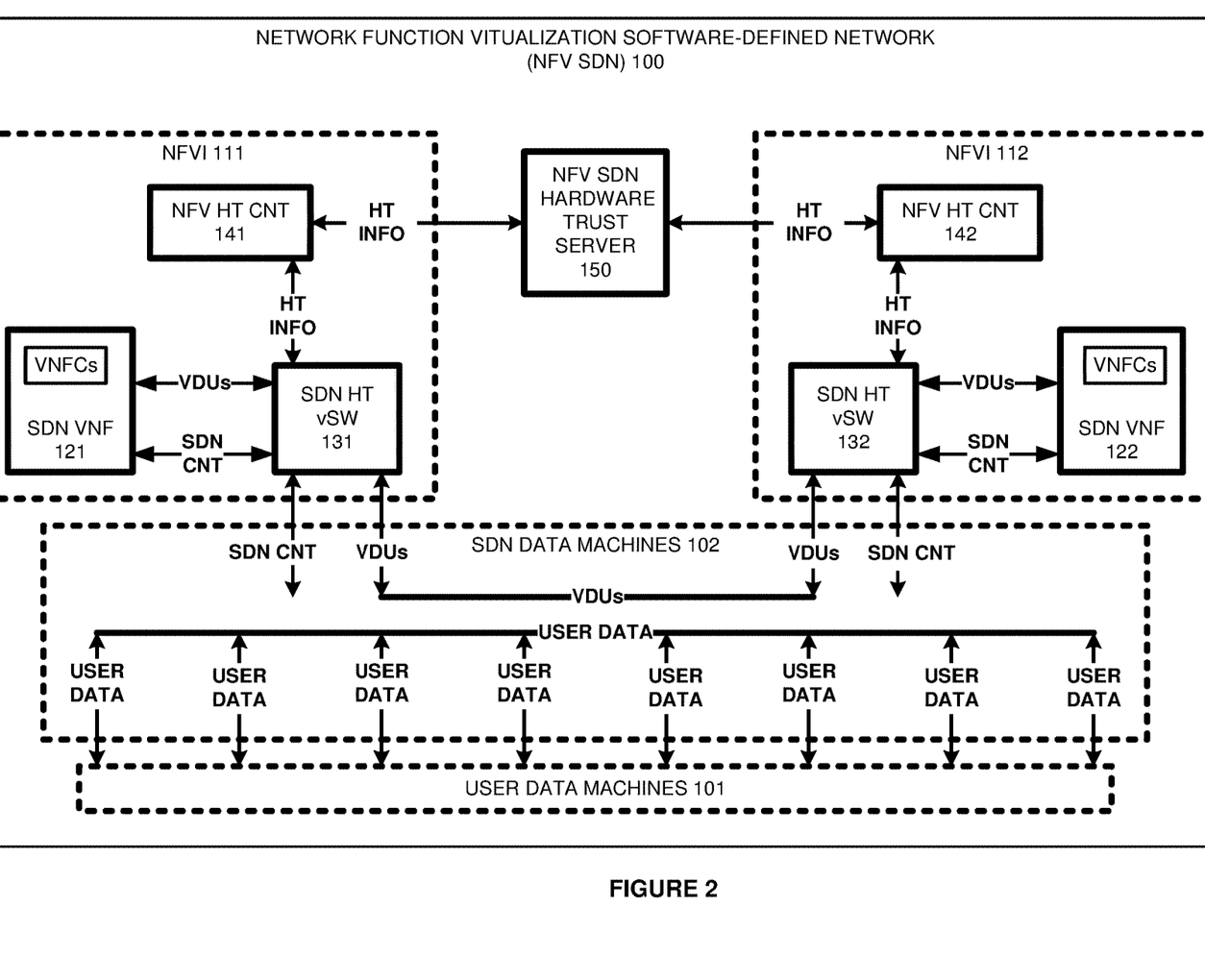

FIG. 2 illustrates another example of NFV SDN 100. NFV SDN 100 now comprises NFVI 111 and NFVI 112. NFVI 111 hosts SDN VNF 121, SDN HT vSW 131, and NFV HT controller 141. NFVI 112 now hosts SDN VNF 122, SDN HT vSW 132, and NFV HT controller 142. SDN VNFs 121-122 exchange SDN control data with SDN data machines 102 over SDN HT vSWs 131-132 (or some other HT vSWs). SDN data machines 102 process the SDN control data to perform networking actions on the user data like packet forwarding, storing, and dropping to support the NFV SDN data services.

A VNFC in SDN VNF 121 transfers a VDU to SDN HT vSW 131 for delivery to a VNFC in SDN VNF 122 through SDN HT vSW 132. Before making the VDU transfer though anther vSW, SDN HT vSW 131 checks its hardware trust information from HT controller 141 to verify that target SDN HT vSW 132 is hardware trusted. If target SDN HT vSW 132 is trusted, then SDN HT vSW 131 transfers the VDU over SDN data machines 102 to SDN HT vSW 132 for delivery to the VNFC in VNF 122. SDN HT vSW 132 transfers the VNFC to the target VNFC in VNF 122.

Target SDN HT vSW 132 may also apply hardware trust filtering upon VDU receipt from another vSW. The VDU transferred by the VNFC in SDN VNF 121 over SDN HT vSW 131 and SDN data machines 102 arrives at SDN HT vSW 132 for delivery to the target VNFC in SDN VNF 122. Before making the VDU transfer, SDN HT vSW 132 checks its hardware trust information from HT controller 142 to verify that source SDN HT vSW 131 is hardware trusted. If hardware trust is verified for source SDN HT vSW 131, then target SDN HT vSW 132 transfers the VDU to the target VNFC in VNF 122.

SDN HT vSWs 131-132 may also report additional information for their served VNFs like VNFCs, NFV threads, NFVIs, NFV servers, NFV descriptors, or some other networking data. NFV HT controllers 141-142 report this information to hardware trust server 150, and server 150 associates the vSW hardware trust for served VNFs with other data like VNFCs, NFV threads, NFVIs, NFV servers, and NFV descriptors. Hardware trust server 150 augments the HT information to indicate hardware trust for VNFs, VNFCs, NFV threads, NFVIs, NFV servers, NFV descriptors, or some other networking data. Before making VDU transfers through SDN vSWs, SDN HT vSWs 131-132 may also check hardware trust information from HT controllers 141-142 to verify that, in addition to vSW trust, that one or more of the VNFs, VNFCs, NFV threads, NFVIs, NFV servers, and/or NFV descriptors for the VDU are also hardware trusted. If hardware trust is verified for the target vSW and these other designated trust targets (VNFs, VNFCs, NFV threads, NFVIs, NFV servers, NFV descriptors), then SDN HT vSWs 131-132 transfers the VDU to the target SDN HT vSW for subsequent delivery.

Figure 3:
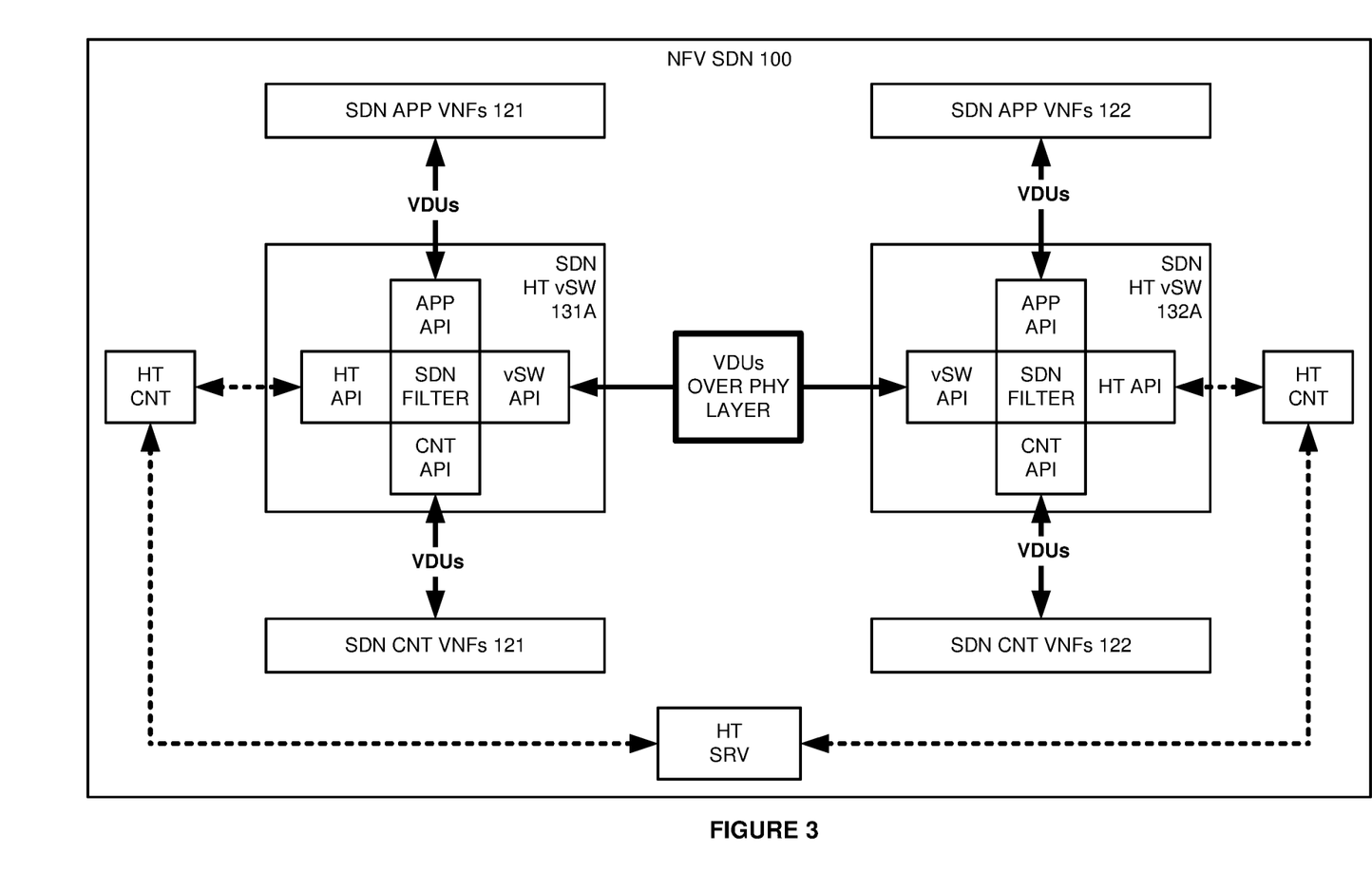

FIG. 3 illustrates an example of SDN HT vSWs 131-132 in NFV SDN 100. SDN HT vSW 131A serves SDN application (APP) VNFs 121 and SDN controller (CNT) VNFs 121. SDN HT vSW 132A serves SDN APP VNFs 122 and SDN controller VNFs 122. SDN HT vSWs 131A and 132A each comprise an SDN APP Application Programming Interface (API), HT API, SDN controller API, vSW API, and SDN filter.

In SDN HT vSW 131A, the SDN APP API informs the HT API of all served SDN APP VNFs 121, and the SDN CNT API informs the HT API of all served SDN CNT VNFs 121. The HT API notifies the HT controller which reports the data to the Hardware Trust (HT) server. In SDN HT vSW 132A, the SDN APP API informs the HT API of all served SDN APP VNFs 122, and the SDN CNT API informs the HT API of all served SDN CNT VNFs 122. The HT API notifies the HT controller which reports the data to the HT server. Note that this reported data may be augmented to indicate VNFCs, NFV servers, NFV threads, NFV servers, and NFVIs for the VNFs. After processing by the HT server, the HT controllers return HT information to the HT APIs in SDN HT vSWs 131A and 132A that indicates the hardware trusted SDN HT vSWs maybe other hardware trusted elements.

A VNFC in SDN APP VNFs 121 may transfer a VDU to the SDN APP API in SDN HT vSW 131A for delivery to another VNFC in SDN APP VNFs 121. The SDN APP API forwards the VDU to the SDN filter. The SDN filter transfers the VDU to the target VNFC in SDN APP VNFs 121 without HT verification because both SDN APP VNFs 121 are served by SDN HT vSW 131A.

A VNFC in SDN APP VNFs 121 may transfer a VDU to the SDN APP API in SDN HT vSW 131 for delivery to a VNFC in SDN application VNFs 122. The SDN APP API forwards the VDU to the SDN filter. Because the VDU will transit to SDN HT vSW 132A over a physical layer, the SDN filter checks the HT API to determine if target SDN HT vSW 132A is hardware trusted. If hardware trust is verified for target SDN HT vSW 132A, then the SDN filter transfers the VDU to the vSW API, and the vSW API transfers the VDU over the physical layer to the vSW API in SDN HT vSW 132A. The physical layer may divide separate CPU cores, CPUs, NFV servers, NFV threads, and/or NFVIs.

In SDN HT vSW 132A, the vSW API transfers the VDU to the SDN filter. Because the VDU has transited from source SDN HT vSW 131A, the SDN filter checks the HT API to determine if source SDN HT vSW 131A is hardware trusted. If hardware trust is verified for source SDN HT vSW 131A, then the SDN filter transfers the VDU to the APP API, and the APP API transfers the VDU to the target VNFC in SDN APP VNFs 122.

A VNFC in SDN APP VNFs 121 may transfer a VDU to the SDN APP API in SDN HT vSW 131A for delivery to another VNFC in SDN CNT VNFs 121. The SDN APP API forwards the VDU to the SDN filter. The SDN filter transfers the VDU to the controller API for transfer to the target VNFC in SDN CNT VNFs 121 without HT verification because both APP and CNT VNFs 121 are served by SDN HT vSW 131A.

A VNFC in SDN application VNFs 121 may transfer a VDU to the SDN APP API in SDN HT vSW 131 for delivery to a VNFC in SDN CNT VNFs 122. The SDN application API forwards the VDU to the SDN filter. Because the VDU will transit to target SDN HT vSW 132A, the SDN filter checks the HT API to determine if target SDN HT vSW 132A is hardware trusted. If hardware trust is verified for target SDN HT vSW 132A, then the SDN filter transfers the VDU to the vSW API, and the vSW API transfers the VDU over the physical layer to the vSW API in target SDN HT vSW 132A. The physical layer may divide separate CPU cores, CPUs, NFV servers, NFV threads, and NFVIs themselves.

In SDN HT vSW 132A, the vSW API transfers the VDU to the SDN filter. Because the VDU has transited from source SDN HT vSW 131A, the SDN filter checks the HT API to determine if source SDN HT vSW 131A is hardware trusted. If hardware trust is verified for source SDN HT vSW 131A, then the SDN filter transfers the VDU to the CNT API, and the CNT API transfers the VDU to the target VNFC in SDN CNT VNFs 122.

Figure 4:
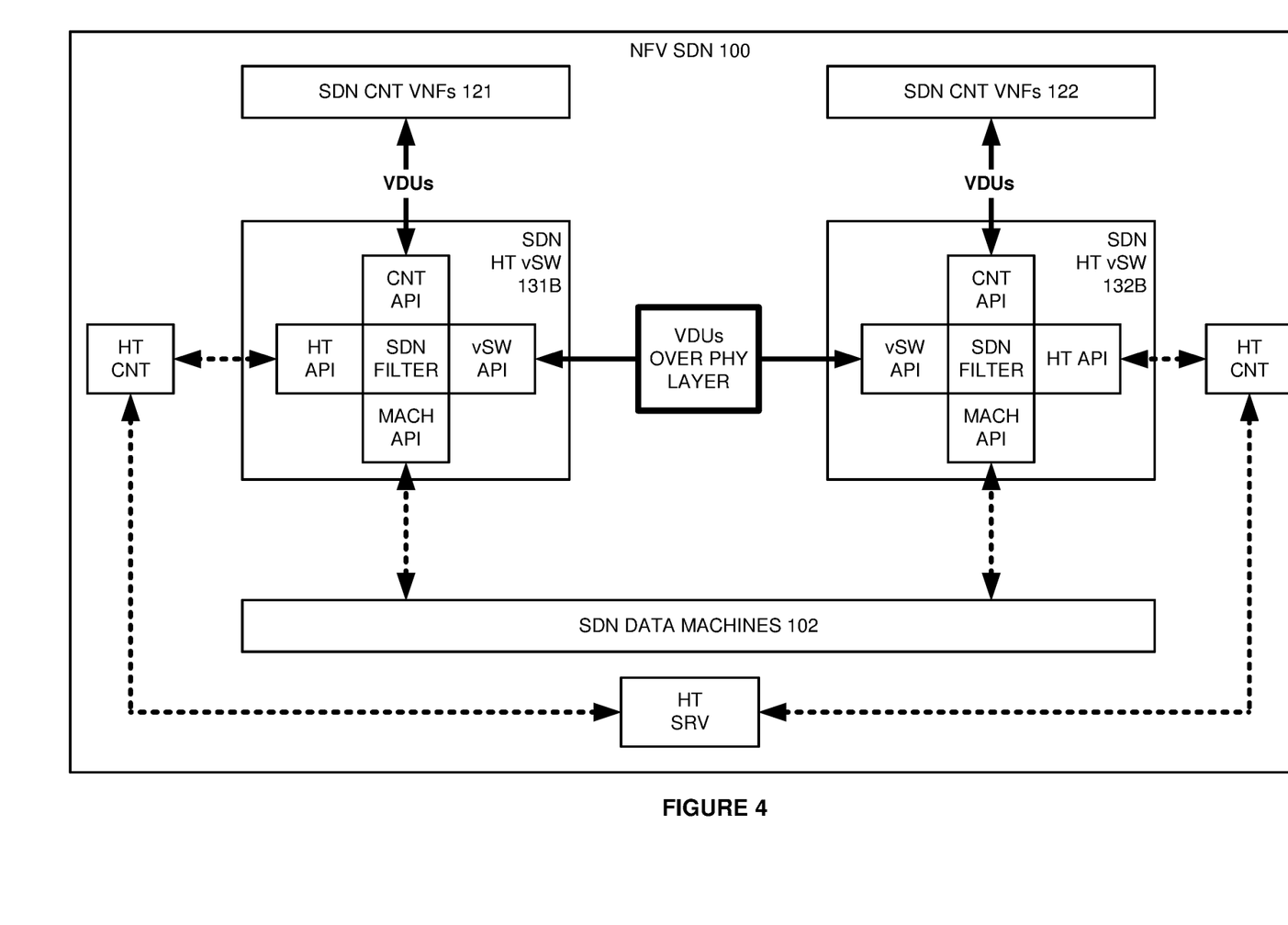

FIG. 4 illustrates another example of SDN HT vSWs 131-132 in NFV SDN 100. SDN HT vSW 131B serves SDN CNT VNFs 121. SDN HT vSW 132B serves SDN CNT VNFs 122. SDN HT vSWs 131B and 132B each comprise an SDN CNT API, HT API, SDN machine (MACH) API, vSW API, and SDN filter.

In SDN HT vSW 131B, the SDN CNT API informs the HT API of all served SDN CNT VNFs 121. The HT API notifies the HT controller which reports the data to the HT server. In SDN HT vSW 132B, the SDN CNT API informs the HT API of all served SDN CNT VNFs 122. The HT API notifies the HT controller which reports the data to the HT server. Note that this reported data may be augmented to indicate VNFCs, NFV servers, NFV threads, NFV servers, and NFVIs for the VNFs. After processing by the HT server, the HT controllers return HT information to the HT APIs in SDN HT vSWs 131B and 132B that indicates the hardware trusted SDN HT vSWs maybe other hardware trusted elements.

A VNFC in SDN CNT VNFs 121 may transfer a VDU to the SDN CNT API in SDN HT vSW 131B for delivery to another VNFC in SDN CNT VNFs 121. The CNT API forwards the VDU to the SDN filter. The SDN filter transfers the VDU to the target VNFC in SDN CNT VNFs 121 without HT verification because both SDN CNT VNFs 121 are served by SDN HT vSW 131B.

A VNFC in SDN APP VNFs 121 may transfer a VDU to the SDN CNT API in SDN HT vSW 131B for delivery to a VNFC in target SDN CNT VNFs 122. The SDN CNT API forwards the VDU to the SDN filter. Because the VDU will transit to target SDN HT vSW 132B, the SDN filter checks the HT API to determine if target SDN HT vSW 132B is hardware trusted. If hardware trust is verified for target SDN HT vSW 132B, then the SDN filter transfers the VDU to the vSW API, and the vSW API transfers the VDU over the physical layer to the vSW API in target SDN HT vSW 132B. The physical layer may divide separate CPU cores, CPUs, NFV servers, NFV threads, and NFVIs.

In target SDN HT vSW 132B, the vSW API transfers the VDU to the SDN filter. Because the VDU has transited from source SDN HT vSW 131B, the SDN filter checks the HT API to determine if source SDN HT vSW 131B is hardware trusted. If hardware trust is verified for source SDN HT vSW 131B, then the SDN filter transfers the VDU to the CNT API, and the CNT API transfers the VDU over to the target VNFC in SDN CNT VNFs 122.

Figure 5:
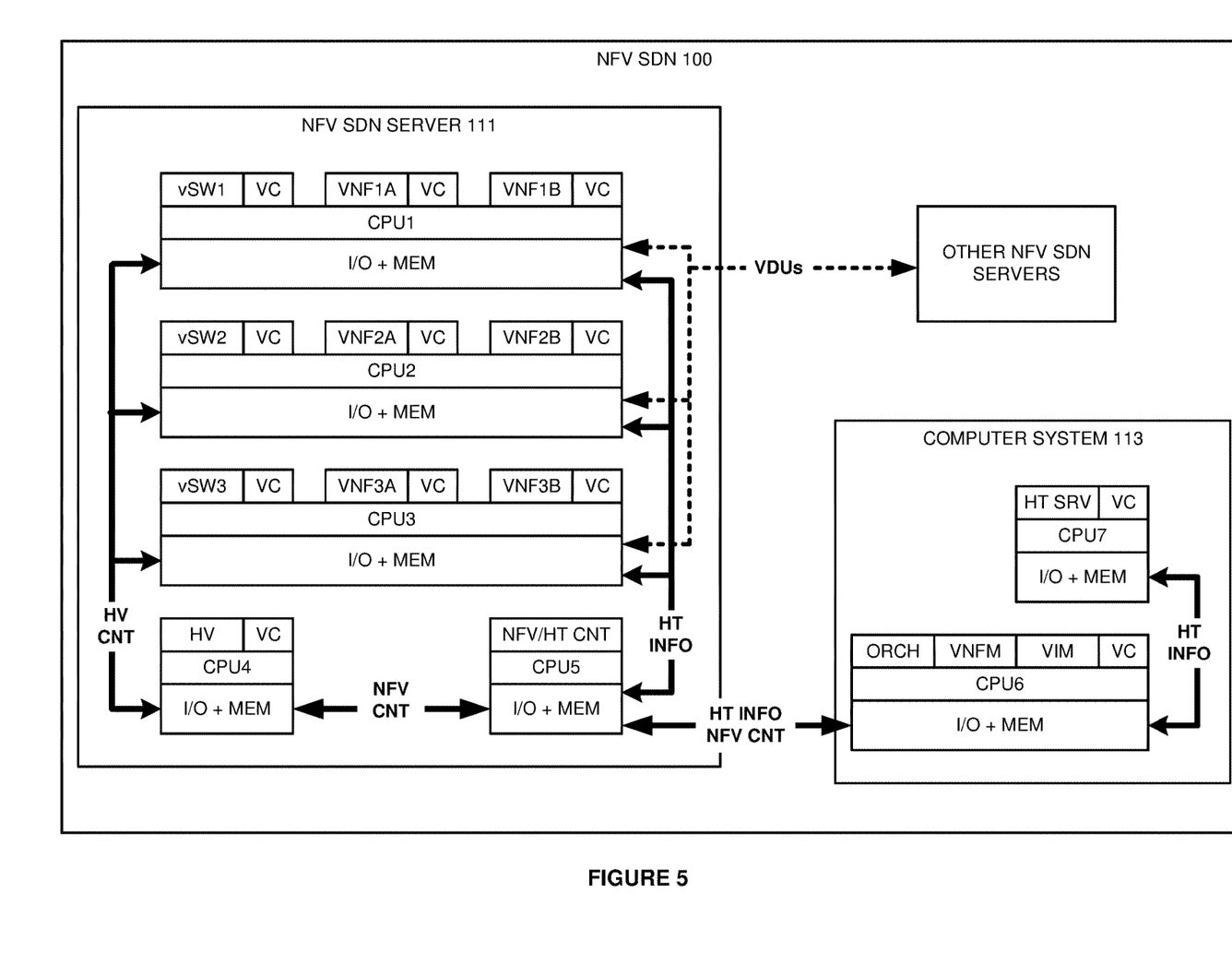

FIG. 5 illustrates an exemplary architecture for NFV SDN 100. NFVI 111 and computer system 113 are shown with Central Processing Units (CPUs), memory units (MEM), and Input/Output transceivers (I/O). This specific hardware design is simplified for illustrative purposes, and actual hardware implementations will vary.

In NFVI 111, VNFs 1A and 1B and their Virtual Containers (VCs) execute on CPU1. A vSW1 and its VC also execute on CPU1 to support VNFs 1A and 1B. VNFs 2A and 2B and their VCs execute on CPU2. A vSW2 and its VC also execute on CPU2 to support VNFs 2A and 2B. VNFs 3A and 3B and their VCs execute on CPU3. A vSW3 and its VC also execute on CPU3 to support VNFs 3A and 3B. A hypervisor (HV) and VC execute on CPU4 to control VNF and vSW access to CPUs 1-3 under NFV control. An NFV/HT controller and VC execute on CPU5 to direct the HV and to communicate NFV control and HT information between NFV/SDN server 111 and computer system 113.

In computer system 113, an NFV Management and Orchestration (MANO) orchestrator (ORCH) and VC execute on CPU6 to direct NFV SDN server 111. A MANO Virtual Infrastructure Manager (VIM) and VC execute on CPU6 to provide a control interface between the MANO orchestrator and the NFV/HT controller in NFV SDN server 111. A MANO VNF Manager (VNFM) and VC execute on CPU7 to provide a control interface between the MANO orchestrator and the VNFs in NFV SDN server 111. An HT server and VC execute on CPU7 to establish hardware trust with the NFV/HT controllers and distribute HT information for hardware trusted vSWs and their VNFs and VNFCs to the NFV/HT controllers.

In NFV SDN server 111, the NFV/HT controller interacts with the HV to prioritize access to the CPUs, memories, and I/O transceivers. The NFV/HT controller establishes hardware trust with the HT server in computer system 113. To establish this hardware trust, the HT server stores a security key that is also stored in a Ring 0 security level read-only memory in CPU5. The HT server transfers a random code to the NFV/HT controller in CPU5, and the NFV/HT controller hashes the random code with the security key to return a hardware trust result to the HT server. The HT server hashes the random code with its stored security key to generate a verification hardware trust result. The HT server then compares the hardware trust result from the NFV/HT controller to its own verification hardware trust result, and if they match, hardware trust between HT server and the NFV/HT controller is established.

The NFV/HT controller directs the hypervisor to execute the vSWs and VNFs on their respective CPUs. The vSWs serves their VNFs with VDU and/or SDN control exchanges. The vSWs report their served VNFs to the NFV/HT controller. The NFV HT controller validates the reported VNF/vSW combinations against its own NFV data and reports the VNF/vSW combinations to the HT server.

The HT server receives and aggregates the reports from the NFV/HT controller and from the MANO orchestrator to associate VNFs and VNFCs with their serving and trusted vSWs. The HT server may validate the vSW/VNF combinations against records from the MANO orchestrator to further validate the vSW/VNF combinations. The HT server transfers hardware trust information (HT INFO) to the NFV/HT controller that indicates the hardware trusted vSWs. This HT information transfer may occur directly or through the orchestrator and/or VIM. The NFV/HT controller transfers the HT information to the vSWs that indicates the hardware trusted vSWs.

VNF 1A transfers a VDU to vSW1 for delivery to VNF 1B. In this example vSW1 transfers the VDU to VNF 1B without hardware trust verification because VNFs 1A and 1B are on the same CPU1. VNF1A transfers a VDU to vSW1 for delivery to VNF 2A. Before making the VDU transfer, vSW1 will check its HT information from the NFV/HT controller to verify that target vSW2 is hardware trusted. If hardware trust is verified for the target vSW2, then the vSW1 transfers the VDU to vSW2 for delivery to in VNF 2A. If hardware trust is not verified for the target 2A, then source vSW1 blocks the transfer of the VDU to untrusted target vSW2.

The HT server hosts information to enable hardware trusted communications across physical boundaries. In this example, the physical boundary is different CPUs. Other examples could enforce similar trust boundaries between different CPU cores, NFV servers, NFV threads, and NFVIs themselves.

In some examples, the vSWs also report additional information for their served VNFs like their VNFCs, NFV threads, NFVIs, NFV servers, NFV descriptors, or some other networking data. The NFV/HT controller reports this information to the HT server. The HT server may further verify this data against records from the MANO orchestrator. The HT server associates the vSW hardware trust for the VNF with the related data like the VNFCs, NFV threads, NFVIs, NFV servers, and NFV descriptors. The HT server augments the HT information to indicate hardware trust for VNFs, VNFCs, NFV threads, NFVIs, NFV servers, NFV descriptors, or some other networking data. Before making VDU transfers, the vSWs may also check their hardware trust information to verify that, in addition to vSW trust, that one or more of the target VNFs, VNFCs, NFV threads, NFVIs, NFV servers, and/or NFV descriptors for the VDU are also hardware trusted.

Figure 6:
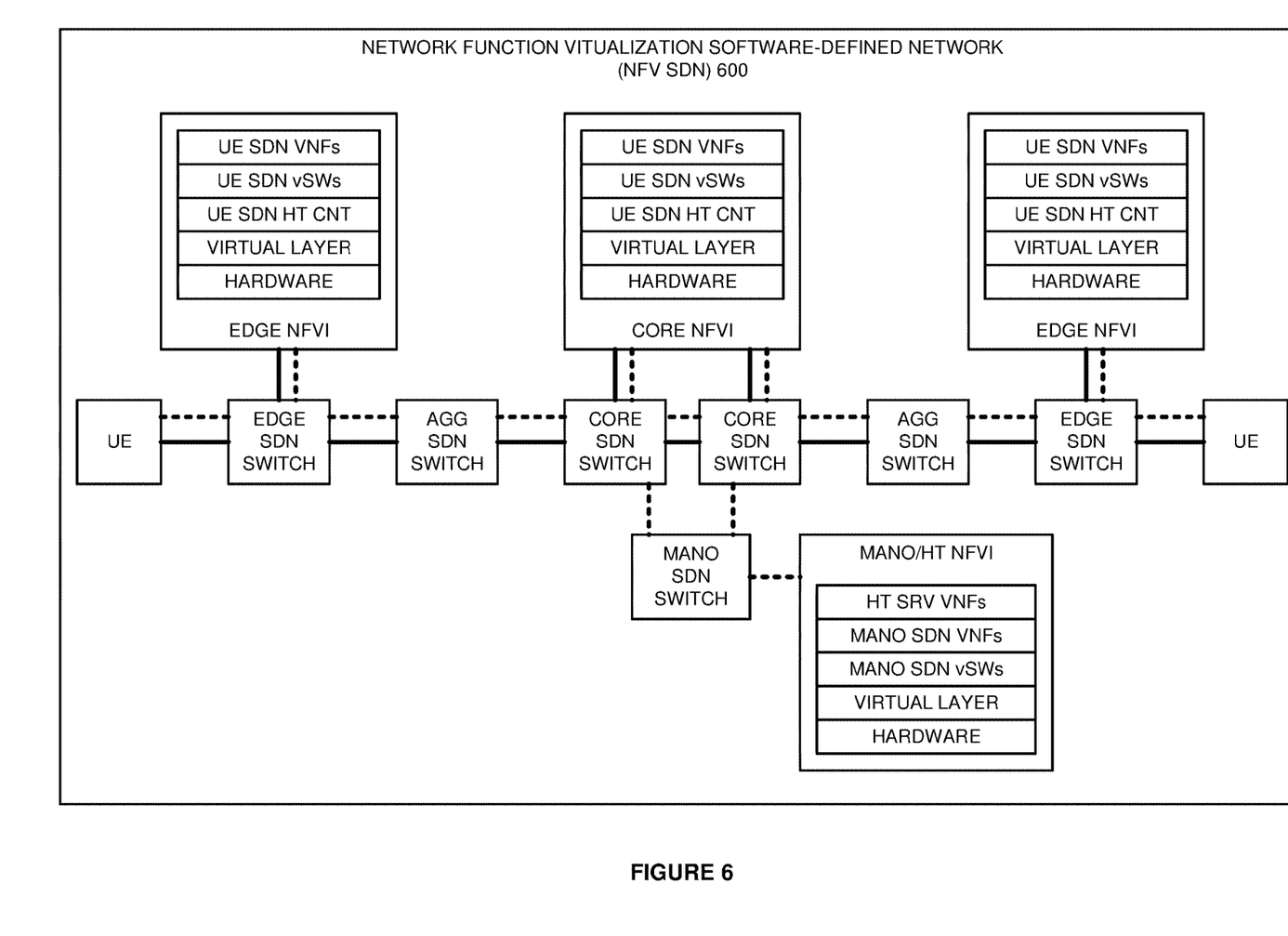
FIG. 6 illustrates an NFV SDN to maintain hardware trusted communications among Virtual Network Functions (VNFs).

FIG. 6 illustrates NFV SDN 600 to maintain hardware trusted communications among VNFs. NFV SDN 600 is an example of NFV SDN 100, although network 100 may use alternative configurations and operations. NFV SDN 600 comprises: User Equipment (UE), edge SDN switches, aggregation (AGG) SDN switches, core SDN switches, a MANO SDN switch, edge NFVIs, a core NFVI, and a MANO/HT NFVI. The NFVIs comprise hardware such as CPU cores, flash memories, and I/O transceivers. The edge SDN switches may include wireless base station VNFs that drive nearby wireless transceivers to exchange wireless data with the UEs.

The NFVIs execute virtual layer software to provide a virtualized processing environment. Under the control of the MANO system, the virtual layers execute various SDN VNFs. In the edge and core NFVIs, the virtual layers execute UE SDN VNFs, UE SDN vSWs, and UE SDN HT controllers. In the MANO NFVI, the virtual layer executes MANO SDN vSWs, MANO SDN VNFs, and HT server VNFs The MANO VNFs transfer networking data to the edge and core NFVI virtual layers to drive the execution of the UE SDN VNFs. To set-up a data session between the UEs, one of the UEs transfers a session request to a UE SDN VNF. The UE SDN VNF informs other UE SDN VNFs to extend the session. The UE SDN VNFs transfer SDN data machine API calls to the SDN switches. API responses flow back to from the SDN switches to the SDN VNFs.

The UE SDN HT controllers establish hardware trust with the HT server and report their vSWs and the served UE SDN VNFs and VNFCs. The HT server distributes information indicating the trusted vSWs and their served VNFs and VNFCs. When a vSW receives a VDU from a VNF that requires another target vSW for delivery, then the source vSW will first check its HT information from its UE SDN HT CNT to verify that the target vSW has hardware trust. The source vSW may also check ensure the target VNF and VNFC are also hardware trusted. The target vSW may also check its HT information from its UE SDN HT CNT to verify that the source vSW has hardware trust. The target vSW may further check to ensure the source VNF and VNFC are also hardware trusted.

Figure 7:
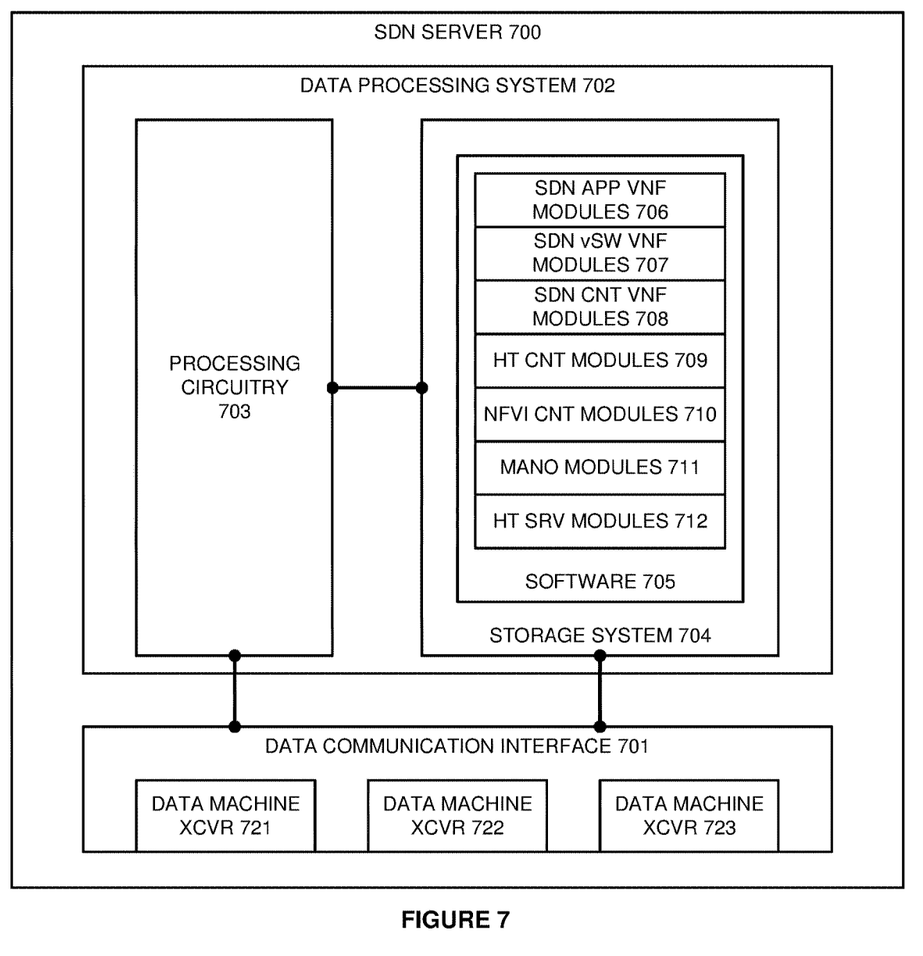
FIG. 7 illustrates an SDN server to maintain hardware trusted communications among Virtual Network Functions (VNFs).

FIG. 7 illustrates Software Defined Network (SDN) server 700 to control Virtual Network Functions (VNFs). SDN server 700 is an example of NFV SDN 100, although network 100 may use alternative configurations and operations. SDN server 700 comprises data communication interface 701 and data processing system 702. Data communication interface 701 comprises data machine transceivers 721-723. Data processing system 702 comprises processing circuitry 703 and storage system 704. Storage system 704 stores software 705. Software 705 includes respective software modules 706-712.

Data machine transceivers 721-723 comprise communication components, such as ports, bus interfaces, signal processors, memory, software, and the like. Processing circuitry 703 comprises server blades, circuit boards, bus interfaces, integrated circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed. Software 705 includes software modules 706-712. SDN server 700 may be centralized or distributed. All or portions of software 706-712 may be externally stored on one or more storage media, such as circuitry, discs, and the like. Some conventional aspects of SDN server 700 are omitted for clarity, such as power supplies, enclosures, and the like.

When executed by processing circuitry 703, software modules 706-712 direct circuitry 703 to perform the following operations. SDN application VNF modules 706 interact with one another and other SDN applications and drive SDN controller modules 708 to deliver data communication services. This SDN application interaction entails the transfer of Virtual Machines (VMs). SDN vSW modules 707 exchange these VNF VMs among VNF modules 706 and 708 and perform hardware trust verifications as directed by HT control modules 709. SDN controller modules 708 interact with SDN application VNFs to drive SDN data machines to deliver data communication services. This SDN controller interaction entails the transfer of VMs. SDN vSW modules 707 exchange these VNF VMs among VNF modules 706 and 708 and perform hardware trust verifications as directed by HT control modules 709.

HT controller modules 709 establish hardware trust with HT server modules 712, report vSW/VNF/VNFC combinations, and distribute HT information to SDN vSW VNF modules 707. NFVI control modules 710 include hypervisors, VCs, and NFVI software to implement NFV VNF controls. SDN MANO modules 711 include orchestrators, VNFMs, and VIMs to direct NFVI operations—including vSW hardware trust information collection and distribution. HT server modules 712 establish hardware trust with HT controller modules 709 and distribute HT information that indicates hardware trusted vSWs, VNFs, and VNFCs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization Infrastructure (NFVI) to maintain hardware-trusted communications, the method comprising:
    the NFVI executing a hardware-trust controller at a Ring 0 security level and executing a target Virtual Switch (vSW) under control of the hardware-trust controller;
    the hardware-trust controller transferring hardware-trust data to the target vSW that indicates hardware-trusted vSWs;
    the target vSW receiving a Virtual Data Unit (VDU) from a source vSW and transferring the VDU when the source vSW is one of the hardware-trusted vSWs; and
    the target vSW blocking the VDU when the source vSW is not one of the hardware-trusted vSWs.

2. The method of claim 1 wherein:
    the hardware-trust controller transferring the hardware-trust data to the target vSW comprises the hardware-trust controller transferring the hardware-trust data that indicates hardware-trusted Virtual Network Functions (VNFs);
    the target vSW receiving the VDU from the source vSW comprises the target vSW receiving the VDU from a source VNF over the source vSW;
    the target vSW transferring the VDU comprises the target vSW transferring the VDU when the source vSW is one of the hardware-trusted vSWs and when the source VNF is one of the hardware-trusted VNFs; and further comprising
    the target vSW blocking the VDU when the source VNF is not one of the hardware-trusted VNFs.

3. The method of claim 2 wherein the source VNF comprises a Software Defined Network (SDN) controller.

4. The method of claim 2 wherein the source VNF comprises a Software Defined Network (SDN) application.

5. The method of claim 1 wherein:
the hardware-trust controller transferring the hardware-trust data to the target vSW comprises the hardware-trust controller transferring the hardware-trust data that indicates hardware-trusted Virtual Network Function Components (VNFCs);
the target vSW receiving the VDU from the source vSW comprises the target vSW receiving the VDU from a source VNFC over the source vSW;
the target vSW transferring the VDU comprises the target vSW transferring the VDU when the source vSW is one of the hardware-trusted vSWs and when the source VNFC is one of the hardware-trusted VNFCs; and further comprising
the target vSW blocking the VDU when the source VNFC is not one of the hardware-trusted VNFCs.

6. The method of claim 1 wherein:
the hardware-trust controller transferring the hardware-trust data to the target vSW comprises the hardware-trust controller transferring the hardware-trust data that indicates hardware-trusted Virtual Network Functions (VNFs);
the target vSW receiving the VDU from the source vSW comprises the target vSW receiving the VDU for delivery to a target VNF;
the target vSW transferring the VDU comprises the target vSW transferring the VDU when the source vSW is one of the hardware-trusted vSWs and when the target VNF is one of the hardware-trusted VNFs; and further comprising
the target vSW blocking the VDU when the target VNF is not one of the hardware-trusted VNFs.

7. The method of claim 1 wherein:
the hardware-trust controller transferring the hardware-trust data to the target vSW comprises the hardware-trust controller transferring the hardware-trust data that indicates hardware-trusted Virtual Network Function Components (VNFCs);
the target vSW receiving the VDU from the source vSW comprises the target vSW receiving the VDU for delivery to a target VNFC;
the target vSW transferring the VDU comprises the target vSW transferring the VDU when the source vSW is one of the hardware-trusted vSWs and when the target VNFC is one of the hardware-trusted VNFCs; and further comprising
the target vSW blocking the VDU when the target VNFC is not one of the hardware-trusted VNFCs.

8. The method of claim 1 wherein the target vSW transferring the VDU comprises the target vSW transferring the VDU to a Software Defined Network (SDN) controller and the target vSW blocking the VDU comprises the target vSW blocking the VDU from the SDN controller.

9. The method of claim 1 wherein the target vSW transferring the VDU comprises the target vSW transferring the VDU to a Software Defined Network (SDN) application and the target vSW blocking the VDU comprises the target vSW blocking the VDU from the SDN application.

10. The method of claim 1 further comprising the hardware-trust controller receiving the hardware-trust data from an NFVI Management and Orchestration (MANO) server.

11. A Network Function Virtualization Infrastructure (NFVI) to maintain hardware-trusted communications, the NFVI comprising:
a hardware-trust controller configured to execute at a Ring 0 security level;
a target Virtual Switch (vSW) configured to execute under control of the hardware-trust controller;
the hardware-trust controller configured to transfer hardware-trust data to the target vSW that indicates hardware-trusted vSWs;
the target vSW configured to receive a Virtual Data Unit (VDU) from a source vSW and transfer the VDU when the source vSW is one of the hardware-trusted vSWs; and
the target vSW configured to block the VDU when the source vSW is not one of the hardware-trusted vSWs.

12. The NFVI of claim 11 wherein:
the hardware-trust controller is configured to transfer the hardware-trust data indicating hardware-trusted Virtual Network Functions (VNFs);
the target vSW is configured to receive the VDU from a source VNF over the source vSW;
the target vSW is configured to transfer the VDU when the source vSW is one of the hardware-trusted vSWs and when the source VNF is one of the hardware-trusted VNFs; and
the target vSW is configured to block the VDU when the source VNF is not one of the hardware-trusted VNFs.

13. The NFVI of claim 12 wherein the source VNF comprises a Software Defined Network (SDN) controller.

14. The NFVI of claim 12 wherein the source VNF comprises a Software Defined Network (SDN) application.

15. The NFVI of claim 11 wherein:
the hardware-trust controller is configured to transfer the hardware-trust data indicating hardware-trusted Virtual Network Function Components (VNFCs);
the target vSW is configured to receive the VDU from a source VNFC over the source vSW;
the target vSW is configured to transfer the VDU when the source vSW is one of the hardware-trusted vSWs and when the source VNFC is one of the hardware-trusted VNFCs; and
the target vSW is configured to block the VDU when the source VNFC is not one of the hardware-trusted VNFCs.

16. The NFVI of claim 11 wherein:
the hardware-trust controller is configured to transfer the hardware-trust data indicating hardware-trusted Virtual Network Functions (VNFs);
the target vSW is configured to receive the VDU for delivery to a target VNF;
the target vSW is configured to transfer the VDU to the target VNF when the source vSW is one of the hardware-trusted vSWs and when the target VNF is one of the hardware-trusted VNFs; and
the target vSW is configured to block the VDU when the target VNF is not one of the hardware-trusted VNFs.

17. The NFVI of claim 11 wherein:
the hardware-trust controller is configured to transfer the hardware-trust data that indicates hardware-trusted Virtual Network Function Components (VNFCs);
the target vSW is configured to receive the VDU for delivery to a target VNFC;
the target vSW is configured to transfer the VDU when the source vSW is one of the hardware-trusted vSWs and when the target VNFC is one of the hardware-trusted VNFCs; and
the target vSW is configured to block the VDU when the target VNFC is not one of the hardware-trusted VNFCs.

18. The NFVI of claim 11 wherein the target vSW is configured to transfer the VDU to a Software Defined Network (SDN) controller and to block the VDU from the SDN controller.

19. The NFVI of claim 11 wherein the target vSW is configured to transfer the VDU to a Software Defined Network (SDN) application and to block the VDU from the SDN application.

20. The NFVI of claim 11 wherein the hardware-trust controller is configured to receive the hardware-trust data from an NFVI Management and Orchestration (MANO) server.

* * * * *